United States Patent
Jo (10) Patent No.: US 9,784,946 B2
(45) Date of Patent: Oct. 10, 2017

(54) OPTICAL SYSTEM

(71) Applicant: SAMSUNG ELECTRO-MECHANICS CO., LTD., Suwon-si (KR)

(72) Inventor: Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/643,838

(22) Filed: Mar. 10, 2015

(65) Prior Publication Data

US 2016/0065811 A1    Mar. 3, 2016

(30) Foreign Application Priority Data

Aug. 28, 2014 (KR) .................. 10-2014-0113299

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC ... G02B 9/60; G02B 9/62; G02B 9/64; G02B 13/0045
USPC ................. 359/713–714, 750–756
See application file for complete search history.

(56) References Cited

U.S. PATENT DOCUMENTS

| | | | | |
|---|---|---|---|---|
| 2014/0029116 A1* | 1/2014 | Tsai | .................. | G02B 13/0045 359/714 |
| 2014/0085735 A1* | 3/2014 | Shih | .................. | G02B 13/0045 359/714 |
| 2014/0226220 A1* | 8/2014 | Tsai | .................. | G02B 3/04 359/708 |
| 2015/0036044 A1 | 2/2015 | Hsu et al. | | |
| 2015/0098137 A1* | 4/2015 | Chung | .............. | G02B 13/0045 359/714 |
| 2015/0103225 A1* | 4/2015 | Hsu | .................. | G02B 13/0045 359/714 |
| 2015/0185440 A1* | 7/2015 | Chen | ................. | G02B 13/0045 359/714 |

FOREIGN PATENT DOCUMENTS

| | | |
|---|---|---|
| JP | 2011-085862 A | 4/2011 |
| JP | 2014-066993 A | 4/2014 |
| TW | 201411221 A | 3/2014 |

OTHER PUBLICATIONS

Korean Office Action dated Jan. 1, 2016, in counterpart Korean Application No. 10-2014-0113299. (11 pages with English translation).

* cited by examiner

*Primary Examiner* — Thomas K Pham
*Assistant Examiner* — Alberto Betancourt
(74) *Attorney, Agent, or Firm* — NSIP Law (57) ABSTRACT

There is provided an optical system including: a first lens having negative refractive power and having a meniscus shape of which an object-side surface is convex; a second lens having positive refractive power; a third lens having negative refractive power; a fourth lens having positive refractive power and having a meniscus shape of which an image-side surface is convex; and a fifth lens having negative refractive power and having a meniscus shape of which an object-side surface is convex, wherein the first to fifth lens are sequentially disposed from an object side, whereby an aberration improvement effect, a wide field of view and a high degree of resolution may be realized.

28 Claims, 12 Drawing Sheets

| Surface | Radius | Thickness | index | abbe |
|---|---|---|---|---|
| object | Infinity | Infinity | | |
| 1 | Infinity | 0.05 | | |
| 2 | 1.25253 | 0.313431 | 1.638 | 23 |
| 3 | 0.86628 | 0.290124 | | |
| 4 | 2.40042 | 0.379842 | 1.5441 | 55 |
| 5 | -1.21351 | 0.151147 | | |
| 6 | 5.72439 | 0.162678 | 1.638 | 23 |
| 7 | 1.72896 | 0.1 | | |
| 8 | -1.54636 | 0.451416 | 1.5441 | 55 |
| 9 | -0.50229 | 0.1 | | |
| 10 | 1.01596 | 0.35213 | 1.5441 | 55 |
| 11 | 0.52304 | 0.34 | | |
| 12 | Infinity | 0.21 | | |
| 13 | Infinity | 0.048128 | | |
| image | Infinity | 0.00516 | | |

FIG. 3

| surface # | 2 | 3 | 4 | 5 | 6 | 7 | 8 | 9 | 10 | 11 |
|---|---|---|---|---|---|---|---|---|---|---|
| Conic Constant (K) | 0 | 0 | -5.632971 | -0.708008 | -0.907885 | 0 | 1.900538 | -0.69677 | -0.413606 | -2.426429 |
| 4th Order Coefficient (A) | 0.281917 | 0.748599 | -0.401736 | -1.10717 | -2.58722 | -1.47989 | 1.64535 | 1.46667 | -0.883163 | -1.33808 |
| 6th Order Coefficient (B) | -0.475429 | -1.96426 | 0.923731 | -2.40995 | 8.60425 | 2.1145 | -20.5936 | -5.75166 | 0.476775 | 3.10894 |
| 8th Order Coefficient (C) | 0.666335 | 6.35794 | -44.4702 | 38.2664 | -61.6495 | 10.2409 | 137.02 | 1.97439 | 0.9281 | -3.41873 |
| 10th Order Coefficient (D) | -0.706384 | -7.70537 | 116.746 | -361.016 | 303.776 | -57.0026 | -445.449 | 57.4224 | -2.0673 | 1.8338 |
| 12th Order Coefficient (E) | 0 | 0 | 1714.84 | 1863.48 | -593.169 | 114.168 | 710.247 | -145.264 | 1.42389 | -0.462789 |
| 14th Order Coefficient (F) | 0 | 0 | -11643.2 | -4391.45 | 226.118 | -85.1298 | -440.948 | 114.413 | -0.339618 | 0.0427428 |

| Surface | Radius | Thickness | index | abbe |
|---|---|---|---|---|
| object | Infinity | Infinity | | |
| 1 | Infinity | 0.05 | | |
| 2 | 1.33124 | 0.31765 | 1.5441 | 55 |
| 3 | 0.90005 | 0.29629 | | |
| 4 | 2.38088 | 0.380739 | 1.5441 | 55 |
| 5 | -1.20761 | 0.159853 | | |
| 6 | 5.58621 | 0.159481 | 1.638 | 23 |
| 7 | 1.64966 | 0.102718 | | |
| 8 | -1.55894 | 0.45596 | 1.5441 | 55 |
| 9 | -0.49825 | 0.1 | | |
| 10 | 1.01751 | 0.33219 | 1.5441 | 55 |
| 11 | 0.54075 | 0.4 | | |
| 12 | Infinity | 0.21 | | |
| 13 | Infinity | -0.013934 | | |
| Image | Infinity | 0.00487 | | |

FIG. 7

| surface# | 2 | 3 | 4 | 5 | 6 | 7 | 8 | 9 | 10 | 11 |
|---|---|---|---|---|---|---|---|---|---|---|
| Conic Constant (K) | 0 | 0 | -5.827956 | -0.906794 | -27.63122 | 0 | 1.881624 | -0.696229 | -0.416578 | -2.255193 |
| 4th Order Coefficient (A) | 0.308935 | 0.774043 | -0.403519 | -1.09262 | -2.60347 | -1.47648 | 1.64792 | 1.46199 | -0.879972 | -1.35585 |
| 6th Order Coefficient (B) | -0.479073 | -1.85762 | 0.9021 | -2.38768 | 8.60432 | 2.11752 | -20.5906 | -5.7572 | 0.471871 | 3.11053 |
| 8th Order Coefficient (C) | 0.658771 | 6.45338 | -44.4608 | 38.1901 | -61.6033 | 19.2475 | 137.022 | 1.97609 | 0.926509 | -3.41631 |
| 10th Order Coefficient (D) | -0.704315 | -8.44633 | 120.772 | -361.674 | 303.995 | -56.9819 | -443.456 | 57.4339 | -2.06771 | 1.83382 |
| 12th Order Coefficient (E) | 0 | 0 | 1714.84 | 1863.48 | -593.169 | 114.229 | 710.206 | -145.238 | 1.42371 | -0.463456 |
| 14th Order Coefficient (F) | 0 | 0 | -11643.2 | -4391.45 | 226.118 | -85.1298 | -440.948 | 114.413 | -0.339747 | 0.0422063 |

| Surface | Radius | Thickness | index | abbe |
|---|---|---|---|---|
| object | Infinity | Infinity | | |
| 1 | Infinity | 0.05 | | |
| 2 | 1.31567 | 0.402604 | 1.5441 | 55 |
| 3 | 0.89024 | 0.371887 | | |
| 4 | 2.12887 | 0.390153 | 1.5441 | 55 |
| 5 | -1.09249 | 0.206338 | | |
| 6 | 11.59692 | 0.151375 | 1.638 | 23 |
| 7 | 1.51103 | 0.11957 | | |
| 8 | -1.50639 | 0.446037 | 1.638 | 23 |
| 9 | -0.49213 | 0.1 | | |
| 10 | 1.02822 | 0.245254 | 1.5441 | 55 |
| 11 | 0.76178 | 0.197744 | | |
| 12 | Infinity | 0.21 | | |
| 13 | Infinity | 0.105103 | | |
| Image | Infinity | -0.005106 | | |

FIG. 11

| surface# | 2 | 3 | 4 | 5 | 6 | 7 | 8 | 9 | 10 | 11 |
|---|---|---|---|---|---|---|---|---|---|---|
| Conic Constant (K) | 0 | 0 | -13.186299 | -1.232599 | -221.304399 | 0 | 1.929709 | -0.704904 | -0.390735 | -2.053411 |
| 4th Order Coefficient (A) | 0.373695 | 0.770753 | -0.471975 | -1.0712 | -2.63766 | -1.46436 | 1.63568 | 1.49989 | -0.919175 | -1.40399 |
| 6th Order Coefficient (B) | -0.445481 | -1.95769 | 0.244934 | -2.87952 | 8.57901 | 2.12847 | -20.5930 | -5.7226 | 0.468938 | 3.11452 |
| 8th Order Coefficient (C) | 0.676597 | 5.83068 | -47.0775 | 34.8877 | -61.6255 | 10.2529 | 137.038 | 2.04796 | 0.928509 | -3.41235 |
| 10th Order Coefficient (D) | -0.692193 | -11.5577 | 171.961 | -388.369 | 304.405 | -57.0052 | -445.382 | 57.5445 | -2.06577 | 1.83555 |
| 12th Order Coefficient (E) | 0 | 0 | 1714.84 | 1863.48 | -593.169 | 114.304 | 710.434 | -145.117 | 1.42538 | -0.463101 |
| 14th Order Coefficient (F) | 0 | 0 | -11643.2 | -4391.45 | 226.118 | -85.5862 | -440.948 | 114.413 | -0.33825 | 0.0419977 |

FIG. 12

OPTICAL SYSTEM

CROSS-REFERENCE TO RELATED APPLICATION

This application claims the priority and benefit of Korean Patent Application No. 10-2014-0113299 filed on Aug. 28, 2014, with the Korean Intellectual Property Office, the disclosure of which is incorporated herein by reference.

BACKGROUND

The present disclosure relates to an optical system.

Recent mobile communications terminals have commonly been provided with camera modules, allowing users to make video calls, as well as to capture still and moving images. In addition, as the degree of functionality of camera modules included in mobile communications terminals has gradually increased, camera modules for mobile communications terminals have come to be required to have high levels of resolution and high degrees of performance.

However, since there is a trend for mobile communications terminals to be miniaturized and lightened, there are limitations in implementing camera modules having high levels of resolution and high degrees of performance.

In order to solve these problems, recently, lenses included in such camera modules have been formed of plastic, a material lighter than glass, and lens modules have been configured with five or more lenses, in order to achieve high levels of resolution in images captured thereby.

SUMMARY

An aspect of the present disclosure may provide an optical system in which an aberration improvement effect, a high degree of resolution, and a wide field of view are realized.

According to an aspect of the present disclosure, an optical system may include: a first lens having negative refractive power and having a meniscus shape of which an object-side surface is convex; a second lens having positive refractive power; a third lens having negative refractive power; a fourth lens having positive refractive power and having a meniscus shape of which an image-side surface is convex; and a fifth lens having negative refractive power and having a meniscus shape of which an object-side surface is convex, wherein the first to fifth lens are sequentially disposed from an object side, whereby an aberration improvement effect, a wide field of view and a high degree of resolution may be realized.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the following lens configuration diagrams, thicknesses, sizes, and shapes of lenses may be exaggerated for clarity. Particularly, the shapes of spherical surfaces and aspherical surfaces, as illustrated in the lens configuration diagrams, are only illustrated by way of example, but are not limited to those illustrated in the drawings.

In addition, a first lens refers to a lens that is the closest to an object side, and a fifth lens refers to a lens that is the closest to an imaging surface.

Further, a first surface of each lens refers to a surface thereof closest to an object (or an object-side surface) and a second surface of each lens refers to a surface thereof closest to an imaging surface (or an image-side surface). Further, all numerical values of radii of curvature, thicknesses, and the like, of lenses are represented by millimeters (mm).

An optical system according to exemplary embodiments in the present disclosure may include five lenses.

That is, the optical system may include a first lens, a second lens, a third lens, a fourth lens, and a fifth lens.

However, the optical system is not limited to including only the five lenses, but may further include other components, if necessary. For example, the optical system may include an aperture stop controlling an amount of light. In addition, the optical system may further include an infrared cut-off filter filtering infrared light. Further, the optical system may further include an image sensor converting an image of a subject incident thereon into an electrical signal. Further, the optical system may further include a gap maintaining member adjusting a gap between lenses.

The first to fifth lenses configuring the optical system according to exemplary embodiments may be formed of plastic.

In addition, at least one of the first to fifth lenses may have an aspherical surface. Alternatively, each of the first to fifth lenses may have at least one aspherical surface.

Here, the aspherical surfaces of the first to fifth lenses may be represented by the following Equation 1:

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{[Equation 1]}$$

Here, c is curvature (the inverse of a radius of curvature) at an apex of the lens, K is a conic constant, and Y is a distance from a certain point on the aspherical surface of the lens to an optical axis in a direction perpendicular to the optical axis. In addition, constants A to F refer to aspherical surface coefficients. In addition, Z is a distance between the certain point on the aspherical surface at the distance Y and a tangential plane meeting the apex of the aspherical surface of the lens.

The optical system including the first to fifth lenses may have negative refractive power/positive refractive power/negative refractive power/positive refractive power/negative refractive power in respective lenses thereof, sequentially from the object side.

The optical system configured as described above may have a wide field of view and improve optical performance through aberration improvement.

The optical system according to exemplary embodiments may satisfy Conditional Expression 1.

$FOV/TTL>31$           [Conditional Expression 1]

Here, FOV is a field of view of the optical system, and TTL is a distance from an object-side surface of the first lens to an imaging surface.

The optical system according to exemplary embodiments may satisfy Conditional Expression 2.

$TTL/F \leq 2.85$           [Conditional Expression 2]

Here, TTL is the distance from the object-side surface of the first lens to the imaging surface, and F is an overall focal length of the optical system.

The optical system according to exemplary embodiments may satisfy Conditional Expression 3.

$-8<F1/F<-4$           [Conditional Expression 3]

Here, F1 is a focal length of the first lens, and F is the overall focal length of the optical system.

The optical system according to exemplary embodiments may satisfy Conditional Expression 4.

$1.1<F2/F<1.4$           [Conditional Expression 4]

Here, F2 is a focal length of the second lens, and F is the overall focal length of the optical system.

The optical system according to exemplary embodiments may satisfy Conditional Expression 5.

$3.5<F3/F<-2.0$           [Conditional Expression 5]

Here, F3 is a focal length of the third lens, and F is the overall focal length of the optical system.

The optical system according to exemplary embodiments may satisfy Conditional Expression 6.

$0.9<F4/F<0.95$           [Conditional Expression 6]

Here, F4 is a focal length of the fourth lens, and F is the overall focal length of the optical system.

The optical system according to exemplary embodiments may satisfy Conditional Expression 7.

$-8.0<F5/F<-2.0$           [Conditional Expression 7]

Here, F5 is a focal length of the fifth lens, and F is the overall focal length of the optical system.

The optical system according to exemplary embodiments may satisfy Conditional Expression 8.

$FOV>90$           [Conditional Expression 8]

Here, FOV is the field of view of the optical system.

Next, the first to fifth lenses configuring the optical system according to exemplary embodiments will be described.

The first lens may have negative refractive power. In addition, the first lens may have a meniscus shape of which an object-side surface is convex. In detail, first and second surfaces of the first lens may be convex toward the object.

At least one of the first and second surfaces of the first lens may be aspherical. For example, both surfaces of the first lens may be aspherical.

The second lens may have positive refractive power. In addition, both surfaces of the second lens may be convex.

At least one of first and second surfaces of the second lens may be aspherical. For example, both surfaces of the second lens may be aspherical.

The third lens may have negative refractive power. In addition, the third lens may have a meniscus shape of which an object-side surface is convex. In detail, first and second surfaces of the third lens may be convex toward the object.

At least one of the first and second surfaces of the third lens may be aspherical. For example, both surfaces of the third lens may be aspherical.

The fourth lens may have positive refractive power. In addition, the fourth lens may have a meniscus shape of which an image-side surface is convex. In detail, a first surface of the fourth lens may be concave toward the object, and a second surface thereof may be convex toward the imaging surface.

At least one of the first and second surfaces of the fourth lens may be aspherical. For example, both surfaces of the fourth lens may be aspherical.

The fifth lens may have negative refractive power. In addition, the fifth lens may have a meniscus shape of which an object-side surface is convex. In detail, first and second surfaces of the fifth lens may be convex toward the object.

At least one of the first and second surfaces of the fifth lens may be aspherical. For example, both surfaces of the fifth lens may be aspherical.

In addition, the fifth lens may have at least one inflection point formed on the first surface thereof, and also have at least one inflection point formed on the second surface thereof. For example, the second surface of the fifth lens may be concave in the paraxial region and become convex at an edge thereof.

In the optical system configured as described above, a plurality of lenses perform an aberration correction function, whereby aberration performance may be improved.

In addition, the optical system may have a wide field of view (FOV).

In addition, in the optical system, all of the lenses are formed of plastic, whereby costs associated with lens module manufacturing may be decreased and efficiency in the lens module manufacturing may be increased.

An optical system according to a first exemplary embodiment in the present disclosure will be described with reference to FIGS. 1 through 4.

Figure 1:
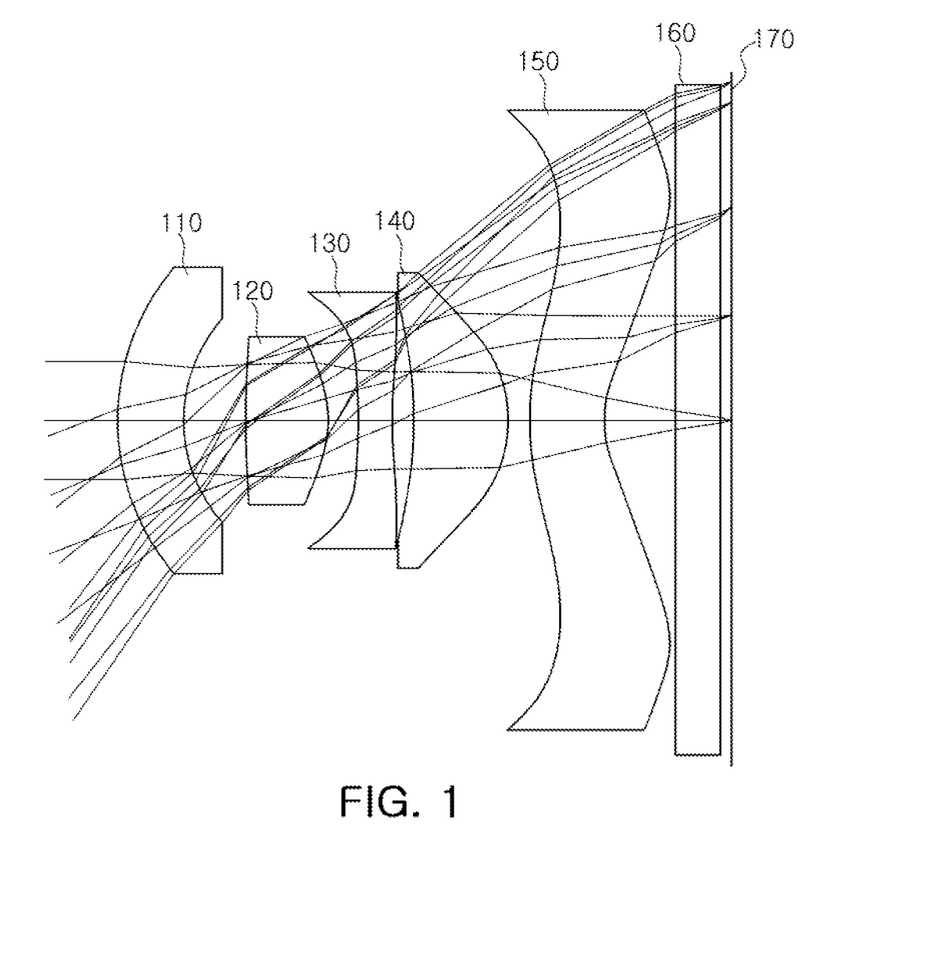
FIG. 1 is a configuration diagram of an optical system according to a first exemplary embodiment of the present disclosure.

The optical system according to the first exemplary embodiment may include a first lens 110, a second lens 120, a third lens 130, a fourth lens 140, and a fifth lens 150, and may further include an infrared cut-off filter 160 and an image sensor 170.

Here, as shown in Table 1, a field of view (FOV) of the optical system may be 100 degrees, and a distance (TTL) from an object-side surface of the first lens 110 to a first surface (imaging surface) of the image sensor 170 may be 2.95 mm.

In addition, a focal length (F1) of the first lens 110 may be −6.39 mm, a focal length (F2) of the second lens 120 may be 1.53 mm, a focal length (F3) of the third lens 130 may be −3.90 mm, a focal length (F4) of the fourth lens 140 may be 1.18 mm, a focal length (F5) of the fifth lens 150 may be −2.63 mm, and an overall focal length (F) of the optical system may be 1.27 mm.

In the optical system according to the first exemplary embodiment, the first lens 110 among the first to fifth lenses 110 to 150 may have the lowest refractive power.

In addition, the fourth lens 140 among the first to fifth lenses 110 to 150 may have the highest refractive power.

TABLE 1

| | |
|---|---|
| FOV | 100 |
| TTL | 2.95 |
| F | 1.27 |
| F1 | −6.39 |
| F2 | 1.53 |
| F3 | −3.90 |
| F4 | 1.18 |
| F5 | −2.63 |

Figure 3:
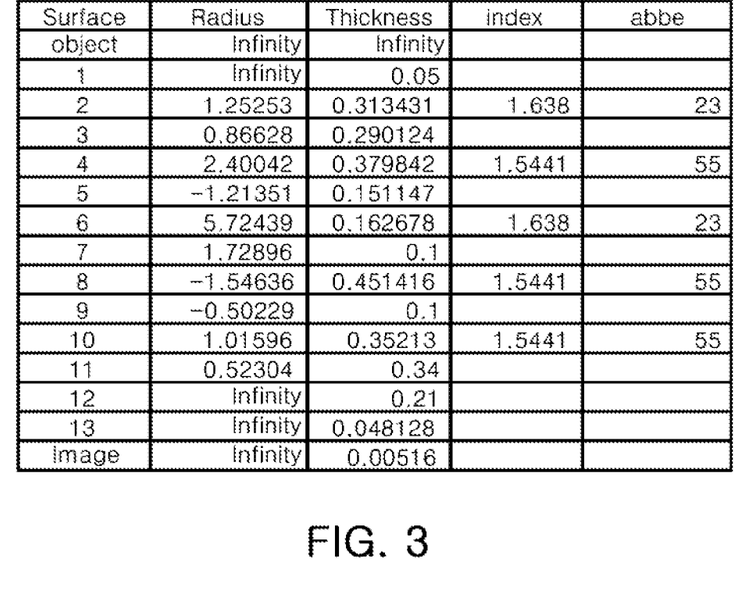
FIG. 3 is a table illustrating respective characteristics of lenses in the optical system illustrated in FIG. 1.

In addition, respective characteristics (radii of curvature, thicknesses of lenses or distances between the lenses, refractive indices, and Abbe numbers) of lenses are shown in FIG. 3.

In the first exemplary embodiment, the first lens 110 may have negative refractive power, and have a meniscus shape of which an object-side surface is convex. The second lens 120 may have positive refractive power and both surfaces thereof may be convex. The third lens 130 may have negative refractive power and have a meniscus shape of which an object-side surface is convex. The fourth lens 140 may have positive refractive power and have a meniscus shape of which an image-side surface is convex. The fifth lens 150 may have negative refractive power and have a meniscus shape of which an object-side surface is convex. In addition, the fifth lens 150 may have at least one inflection point formed on each of first and second surfaces thereof.

Figure 4:
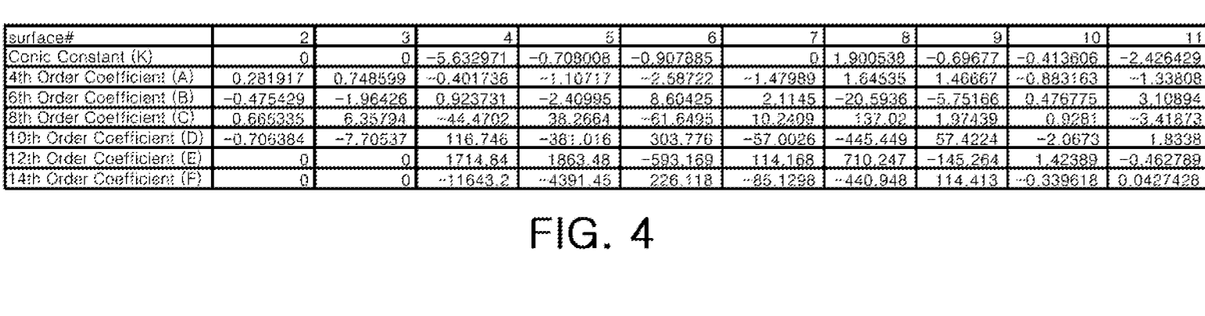
FIG. 4 is a table illustrating respective aspherical surface coefficients of lenses in the optical system illustrated in FIG. 1.

Meanwhile, the respective surfaces of the first to fifth lenses 110 to 150 may have aspherical surface coefficients as shown in FIG. 4. That is, all of the first surface of the first lens 110 to the second surface of the fifth lens 150 may be aspherical.

Figure 2:
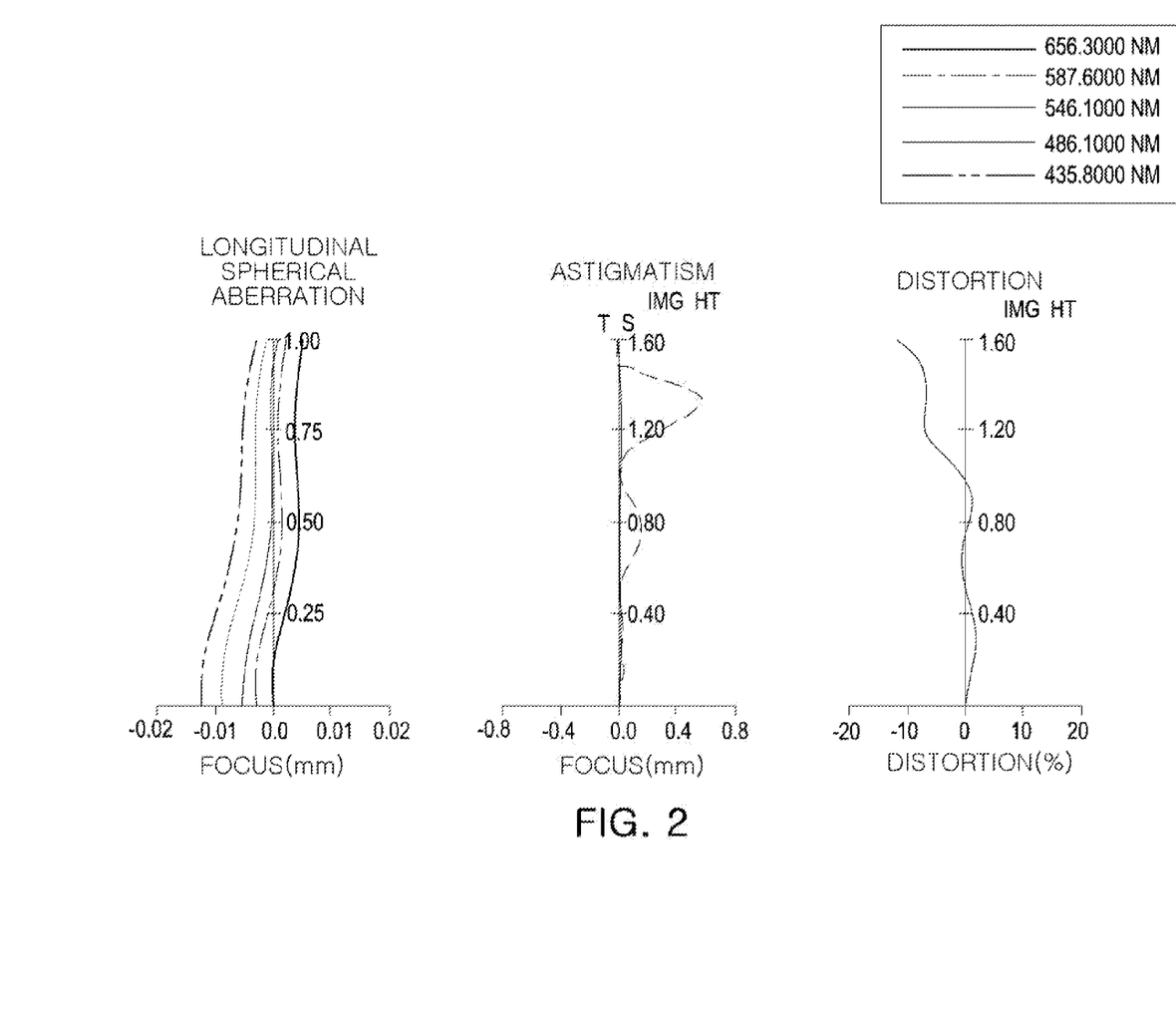
FIG. 2 is graphs having curves representing aberration characteristics of the optical system illustrated in FIG. 1.

In addition, the optical system configured as described above may have aberration characteristics shown in FIG. 2.

An optical system according to a second exemplary embodiment in the present disclosure will be described with reference to FIGS. 5 through 8.

Figure 5:
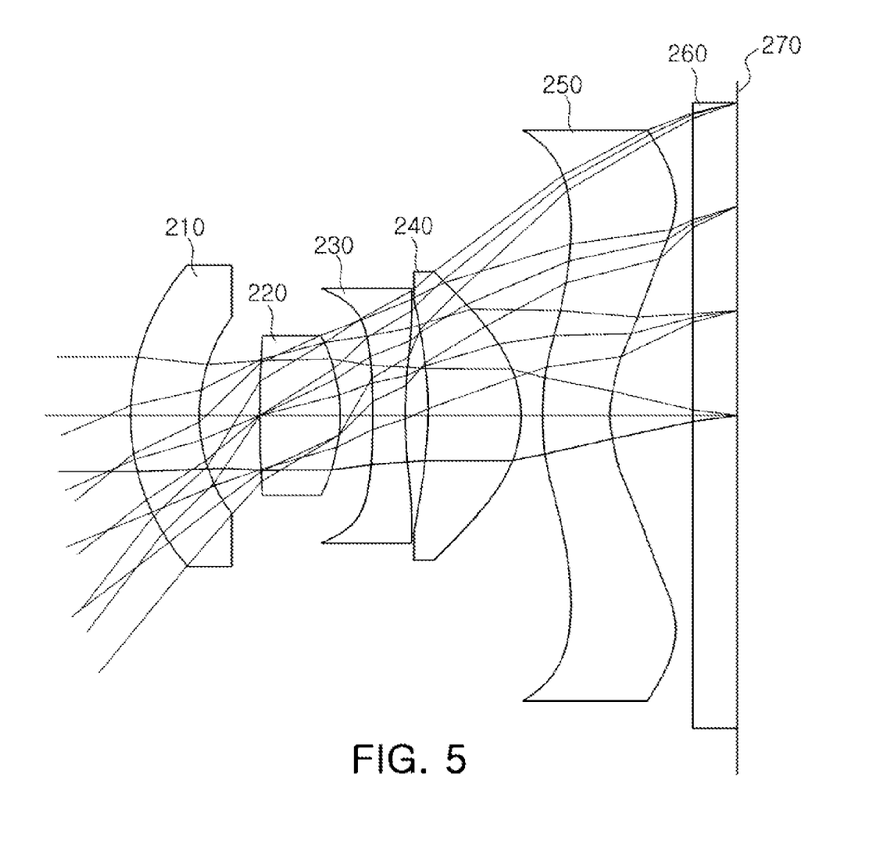
FIG. 5 is a configuration diagram of an optical system according to a second exemplary embodiment of the present disclosure.

The optical system according to the second exemplary embodiment may include a first lens 210, a second lens 220, a third lens 230, a fourth lens 240, and a fifth lens 250, and may further include an infrared cut-off filter 260 and an image sensor 270.

Here, as shown in Table 2, a field of view (FOV) of the optical system may be 100 degrees, and a distance (TTL) from an object-side surface of the first lens 210 to a first surface (imaging surface) of the image sensor 270 may be 2.95 mm.

In addition, a focal length (F1) of the first lens 210 may be −6.87 mm, a focal length (F2) of the second lens 220 may be 1.52 mm, a focal length (F3) of the third lens 230 may be −3.69 mm, a focal length (F4) of the fourth lens 240 may be 1.16 mm, a focal length (F5) of the fifth lens 250 may be −2.80 mm, and an overall focal length (F) of the optical system may be 1.25 mm.

In the optical system according to the second exemplary embodiment, the first lens 210 among the first to fifth lenses 210 to 250 may have the lowest refractive power.

In addition, the fourth lens 240 among the first to fifth lenses 210 to 250 may have the highest refractive power.

TABLE 2

| | |
|---|---|
| FOV | 100 |
| TTL | 2.95 |
| F | 1.25 |
| F1 | −6.87 |
| F2 | 1.52 |
| F3 | −3.69 |
| F4 | 1.16 |
| F5 | −2.80 |

Figure 7:
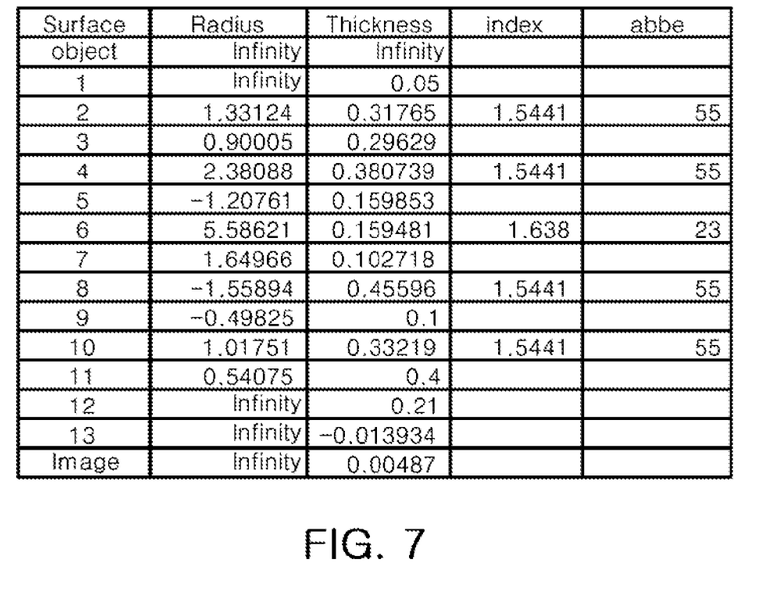
FIG. 7 is a table illustrating respective characteristics of lenses in the optical system illustrated in FIG. 5.

In addition, respective characteristics (radii of curvature, thicknesses of lenses or distances between the lenses, refractive indices, and Abbe numbers) of lenses are shown in FIG. 7.

In the second exemplary embodiment, the first lens 210 may have negative refractive power, and have a meniscus shape of which an object-side surface is convex. The second lens 220 may have positive refractive power and both surfaces thereof may be convex. The third lens 230 may have negative refractive power and have a meniscus shape of which an object-side surface is convex. The fourth lens 240 may have positive refractive power and have a meniscus shape of which an image-side surface is convex. The fifth lens 250 may have negative refractive power and have a meniscus shape of which an object-side surface is convex. In addition, the fifth lens 250 may have at least one inflection point formed on each of first and second surfaces thereof.

Figure 8:
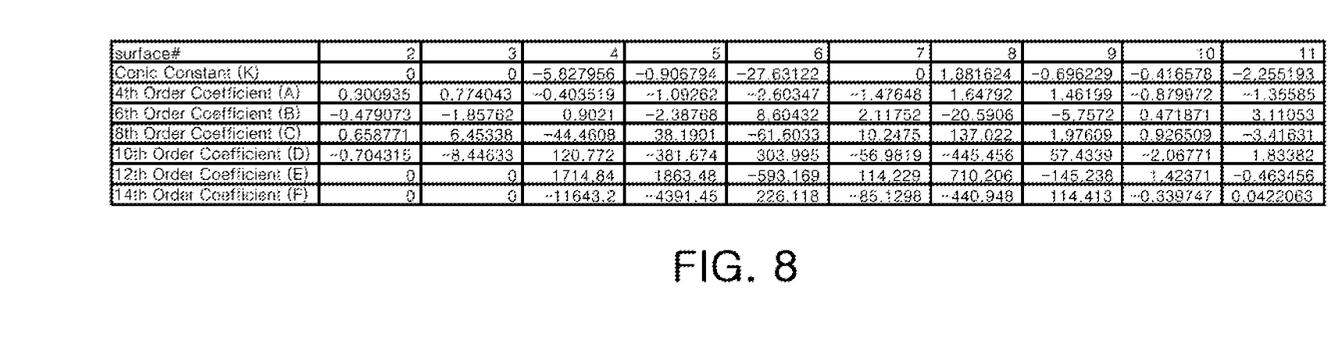
FIG. 8 is a table illustrating respective aspherical surface coefficients of lenses in the optical system illustrated in FIG. 5.

Meanwhile, the respective surfaces of the first to fifth lenses 210 to 250 may have aspherical surface coefficients as shown in FIG. 8. That is, all of the first surface of the first lens 210 to the second surface of the fifth lens 250 may be aspherical.

Figure 6:
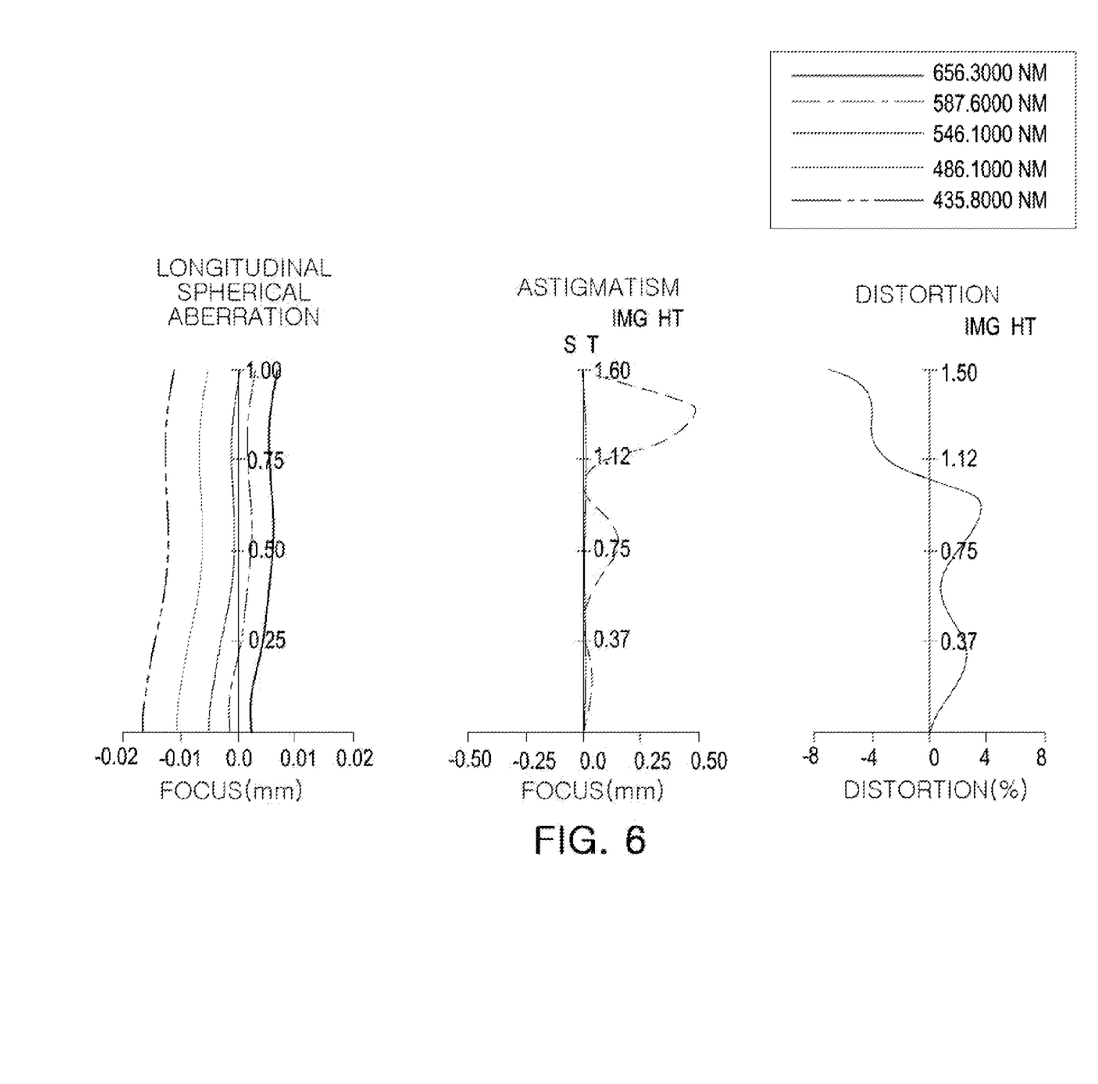
FIG. 6 is graphs having curves representing aberration characteristics of the optical system illustrated in FIG. 5.

In addition, the optical system configured as described above may have aberration characteristics shown in FIG. 6.

An optical system according to a third exemplary embodiment in the present disclosure will be described with reference to FIGS. 9 through 12.

Figure 9:
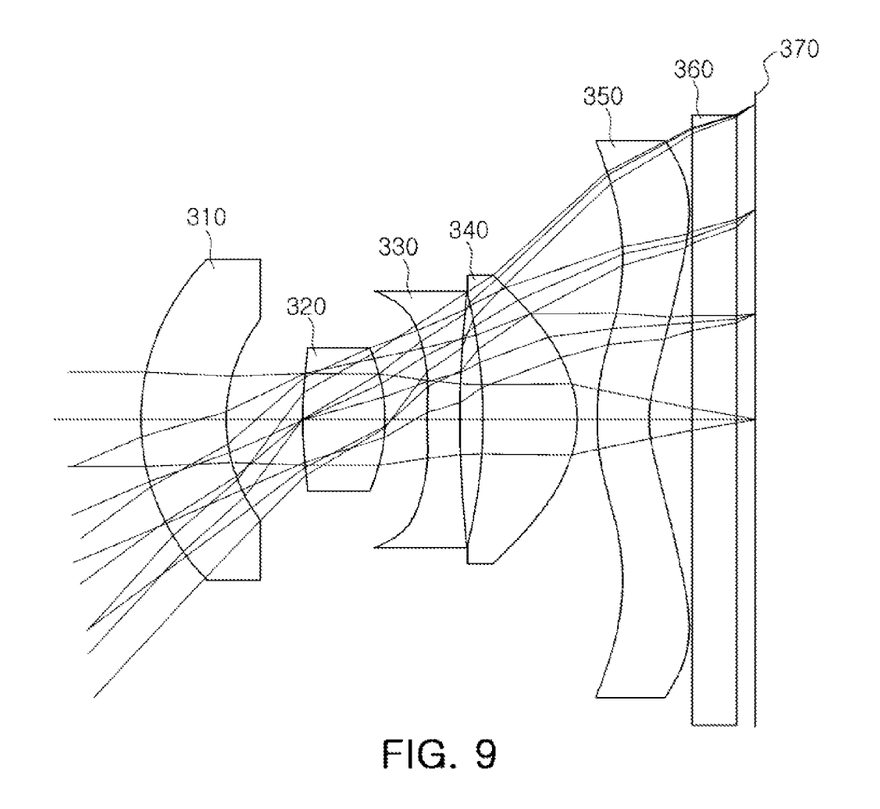
FIG. 9 is a configuration diagram of an optical system according to a third exemplary embodiment of the present disclosure.

The optical system according to the third exemplary embodiment may include a first lens 310, a second lens 320, a third lens 330, a fourth lens 340, and a fifth lens 350, and may further include an infrared cut-off filter 360 and an image sensor 370.

Here, as shown in Table 3, a field of view (FOV) of the optical system may be 95 degrees, and a distance (TTL)

from an object-side surface of the first lens 310 to a first surface (imaging surface) of the image sensor 370 may be 2.99 mm.

In addition, a focal length (F1) of the first lens 310 may be −7.56 mm, a focal length (F2) of the second lens 320 may be 1.38 mm, a focal length (F3) of the third lens 330 may be −2.71 mm, a focal length (F4) of the fourth lens 340 may be 0.96 mm, a focal length (F5) of the fifth lens 350 may be −7.97 mm, and an overall focal length (F) of the optical system may be 1.05 mm.

In the optical system according to the third exemplary embodiment, the fourth lens 340 among the first to fifth lenses 310 to 350 may have the highest refractive power.

TABLE 3

| FOV | 95 |
|---|---|
| TTL | 2.99 |
| F | 1.05 |
| F1 | −7.56 |
| F2 | 1.38 |
| F3 | −2.71 |
| F4 | 0.96 |
| F5 | −7.97 |

Figure 11:
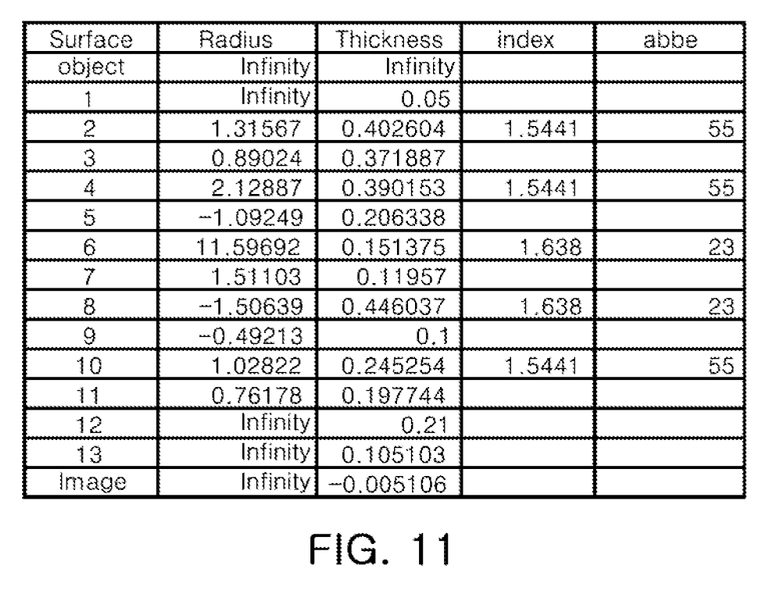
FIG. 11 is a table illustrating respective characteristics of lenses in the optical system illustrated in FIG. 9.

In addition, respective characteristics (radii of curvature, thicknesses of lenses or distances between the lenses, refractive indices, and Abbe numbers) of lenses are shown in FIG. 11.

In the third exemplary embodiment, the first lens 310 may have negative refractive power, and have a meniscus shape of which an object-side surface is convex. The second lens 320 may have positive refractive power and both surfaces thereof may be convex. The third lens 330 may have negative refractive power and have a meniscus shape of which an object-side surface is convex. The fourth lens 340 may have positive refractive power and have a meniscus shape of which an image-side surface is convex. The fifth lens 350 may have negative refractive power and have a meniscus shape of which an object-side surface is convex. In addition, the fifth lens 350 may have at least one inflection point formed on each of first and second surfaces thereof.

Figure 12:
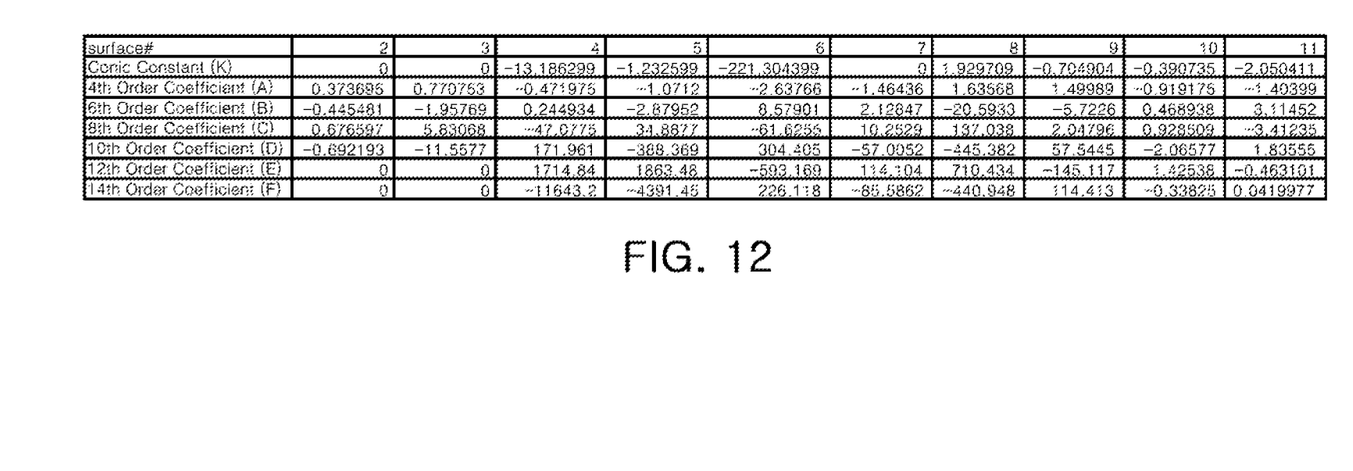
FIG. 12 is a table illustrating respective aspherical surface coefficients of lenses in the optical system illustrated in FIG. 9.

Meanwhile, the respective surfaces of the first to fifth lenses 310 to 350 may have aspherical surface coefficients as shown in FIG. 12. That is, all of the first surface of the first lens 310 to the second surface of the fifth lens 350 may be aspherical.

Figure 10:
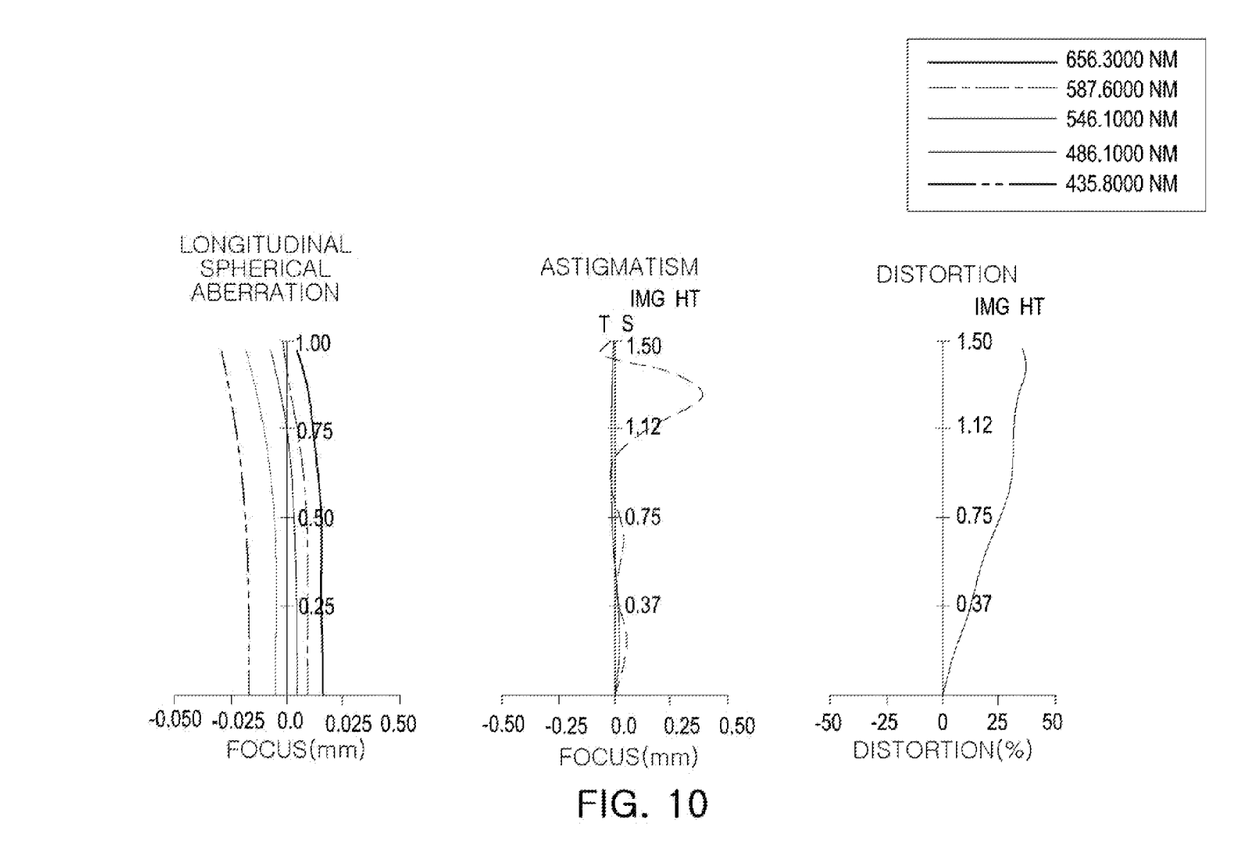
FIG. 10 is graphs having curves representing aberration characteristics of the optical system illustrated in FIG. 9.

In addition, the optical system configured as described above may have aberration characteristics shown in FIG. 10.

TABLE 4

| | First Exemplary Embodiment | Second Exemplary Embodiment | Third Exemplary Embodiment |
|---|---|---|---|
| FOV/TTL | 33.90 | 33.90 | 31.77 |
| TTL/F | 2.32 | 2.36 | 2.85 |
| F1/F | −5.03 | −5.50 | −7.20 |
| F2/F | 1.20 | 1.22 | 1.31 |
| F3/F | −3.07 | −2.95 | −2.58 |
| F4/F | 0.93 | 0.93 | 0.91 |
| F5/F | −2.07 | −2.24 | −7.59 |
| FOV | 100 | 100 | 95 |

Meanwhile, it may be appreciated from Table 4 that the optical systems according to the first to third exemplary embodiments satisfy Conditional Expressions 1 to 8 described above. Therefore, a wide field of view may be obtained, and optical performance may be improved.

As set forth above, with the optical systems according to exemplary embodiments of the present disclosure, the wide field of view may be broadened, and the aberration improvement effect may be increased to improve optical performance.

While exemplary embodiments have been shown and described above, it will be apparent to those skilled in the art that modifications and variations could be made without departing from the scope of the present invention as defined by the appended claims.

What is claimed is:
1. An optical system comprising:
a first lens having negative refractive power and having a meniscus shape of which an object-side surface is convex;
a second lens having positive refractive power;
a third lens having negative refractive power and a convex object-side surface;
a fourth lens having positive refractive power and having a meniscus shape of which an image-side surface is convex; and
a fifth lens having negative refractive power and having a meniscus shape of which an object-side surface is convex,
wherein the first to fifth lenses are sequentially disposed from an object side, and
wherein 1.1<F2/F<1.4, where F2 is a focal length of the second lens, and F is an overall focal length of the optical system.

2. The optical system of claim 1, wherein both surfaces of the second lens are convex.

3. The optical system of claim 1, wherein the third lens has a meniscus shape.

4. The optical system of claim 1, wherein the fifth lens has at least one inflection point on the object-side surface thereof.

5. The optical system of claim 1, wherein the fifth lens has at least one inflection point on an image-side surface thereof.

6. The optical system of claim 1, further comprising an image sensor converting an image of a subject incident through the first to fifth lenses into an electrical signal,
wherein Conditional Expression 1 is satisfied:

$$FOV/TTL>31 \qquad \text{[Conditional Expression 1]}$$

where FOV is a field of view of the optical system, and TTL is a distance from the object-side surface of the first lens to an imaging surface of the image sensor.

7. The optical system of claim 1, further comprising an image sensor converting an image of a subject incident through the first to fifth lenses into an electrical signal,
wherein Conditional Expression 2 is satisfied:

$$TTL/F \leq 2.85 \qquad \text{[Conditional Expression 2]}$$

where TTL is a distance from the object-side surface of the first lens to an imaging surface of the image sensor, and F is an overall focal length of the optical system.

8. The optical system of claim 1, wherein Conditional Expression 3 is satisfied:

$$-8<F1/F<=4 \qquad \text{[Conditional Expression 3]}$$

where F1 is a focal length of the first lens, and F is an overall focal length of the optical system.

9. The optical system of claim 1, wherein Conditional Expression 5 is satisfied:

$$-3.5<F3/F<-2.0 \qquad \text{[Conditional Expression 5]}$$

where F3 is a focal length of the third lens, and F is an overall focal length of the optical system.

10. The optical system of claim 1, wherein Conditional Expression 6 is satisfied:

$$0.9 < F4/F < 0.95 \quad \text{[Conditional Expression 6]}$$

where F4 is a focal length of the fourth lens, and F is an overall focal length of the optical system.

11. The optical system of claim 1, wherein Conditional Expression 7 is satisfied:

$$-8.0 < F5/F < -2.0 \quad \text{[Conditional Expression 7]}$$

where F5 is a focal length of the fifth lens, and F is an overall focal length of the optical system.

12. The optical system of claim 1, wherein Conditional Expression 8 is satisfied:

$$FOV > 90 \quad \text{[Conditional Expression 8]}$$

where FOV is a field of view of the optical system.

13. The optical system of claim 1, wherein the first to fifth lenses are plastic lenses.

14. The optical system of claim 1, wherein all of respective surfaces of the first to fifth lenses are aspherical.

15. The optical system of claim 1, wherein the fourth lens among the first to fifth lenses has the highest refractive power.

16. The optical system of claim 1, wherein the first lens among the first to fifth lenses has the lowest refractive power.

17. An optical system comprising: a first lens having refractive power and having a convex object-side surface; a second lens having positive refractive power; a third lens having refractive power and having a convex object-side surface; a fourth lens having refractive power and having a meniscus shape of which an image-side surface is convex; a fifth lens having refractive power and having a meniscus shape of which an object-side surface is convex; and an image sensor converting an image of a subject incident through the first to fifth lenses into an electrical signal, wherein the first to fifth lenses and the image sensor are sequentially disposed from an object side, the first lens among the first to fifth lenses has the lowest refractive power, wherein −3.5<F3/F<−2.0, where F3 is a focal length of the third lens, and F is an overall focal length of the optical system, and wherein 1.1 c F2/F<1.4, where F2 is a focal length of the second lens, and wherein −8.0<F5/F<−2.0 where F5 is a focal length of the fifth lens.

18. The optical system of claim 17, wherein Conditional Expression 2 is satisfied:

$$TTL/F \leq 2.85 \quad \text{[Conditional Expression 2]}$$

where F is an overall focal length of the optical system and TTL is a distance from the object-side surface of the first lens to an imaging surface of the image sensor.

19. The optical system of claim 17, wherein Conditional Expression 3 is satisfied:

$$-8 < F1/F < -4 \quad \text{[Conditional Expression 3]}$$

where F1 is a focal length of the first lens, and F is an overall focal length of the optical system.

20. The optical system of claim 17, wherein Conditional Expression 6 is satisfied:

$$0.9 < F4/F < 0.95 \quad \text{[Conditional Expression 6]}$$

where F4 is a focal length of the fourth lens, and F is an overall focal length of the optical system.

21. The optical system of claim 17, wherein Conditional Expression 8 is satisfied:

$$FOV > 90, \quad \text{[Conditional Expression 8]}$$

where FOV is a field of view of the optical system.

22. The optical system of claim 17, wherein the first lens has negative refractive power and has a concave image-side surface.

23. The optical system of claim 17, wherein both surfaces of the second lens are convex.

24. The optical system of claim 17, wherein the third lens has negative refractive power and has a concave image-side surface.

25. The optical system of claim 17, wherein the fourth lens has positive refractive power.

26. The optical system of claim 17, wherein the fifth lens has negative refractive power and has at least one inflection point on each of the object-side surface and an image-side surface thereof.

27. The optical system of claim 17, wherein Conditional Expression 1 is satisfied:

$$FOV/TTL > 31 \quad \text{[Conditional Expression 1]}$$

where FOV is a field of view of the optical system, and TTL is a distance from the object-side surface of the first lens to an imaging surface of the image sensor.

28. An optical system comprising:
a first lens having negative refractive power and having a meniscus shape of which an object-side surface is convex;
a second lens having positive refractive power;
a third lens having negative refractive power;
a fourth lens having positive refractive power and having a meniscus shape of which an image-side surface is convex; and
a fifth lens having negative refractive power and having a meniscus shape of which an object-side surface is convex,
wherein the first to fifth lenses are sequentially disposed from an object side, and the following expressions are satisfied:

$$-8 < F1/F < -4;$$

$$1.1 < F2/F < 1.4;$$

$$-3.5 < F3/F < -2.0;$$

$$0.9 < F4/F < 0.95; \text{ and}$$

$$-8.0 < F5/F < -2.0,$$

where F1 is a focal length of the first lens, F2 is a focal length of the second lens, F3 is a focal length of the third lens, F4 is a focal length of the fourth lens, F5 is a focal length of the fifth lens, and F is an overall focal length of the optical system.

* * * * *